Dec. 24, 1957   R. A. LINES   2,817,497
POST HOLE DIGGER
Filed June 28, 1955

United States Patent Office 2,817,497
Patented Dec. 24, 1957

2,817,497

POST HOLE DIGGER

Raydon Ayers Lines, Woodville South, South Australia, Australia

Application June 28, 1955, Serial No. 518,561

4 Claims. (Cl. 255—69)

This invention relates to an improved post-hole digger and in particular it relates to that type of unit in which a central stem is surrounded by a helical blade which is revolved to cut and raise the dirt as a hole is being dug.

It is customary with this type of post-hole digger to utilise cutting members on the lower end of the helical blade or the stem and it has also been proposed heretofore to provide interchangeable cutting members at the end of the stem.

The devices used heretofore however while being satisfactory in relatively loose soil have not been so successful in rocky ground or where it is necessary to cut through shale or lime-stone formations and it is therefore the object of this invention to provide a simple and effective device which will operate under these conditions.

According to my invention the lower end of the unit is provided with a series of cutting tips which are disposed in a certain pattern so that the force required to drive the unit is reduced and also relatively simple cutting members can be used.

In accordance with this invention the post-hole digger consists of a series of cutters disposed adjacent the termination of a helical boring blade which is carried by a stem. A pilot drill is co-axially disposed upon the stem to extend beyond the tips of the cutters and each cutter is positioned to cut in a separate annular path. Each successive cutter tip from the outermost to the innermost tip projects beyond its joining tip in the direction parallel to the axis of the stem.

Figure 1:
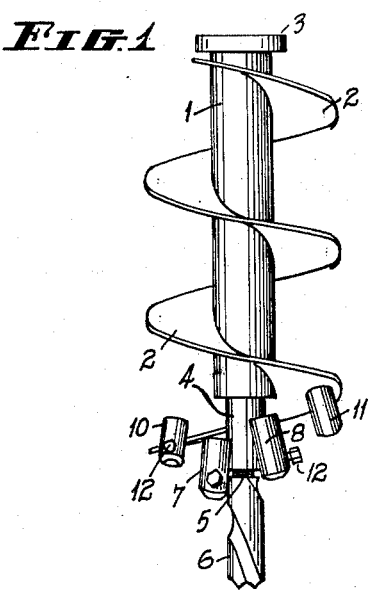
Figure 2:
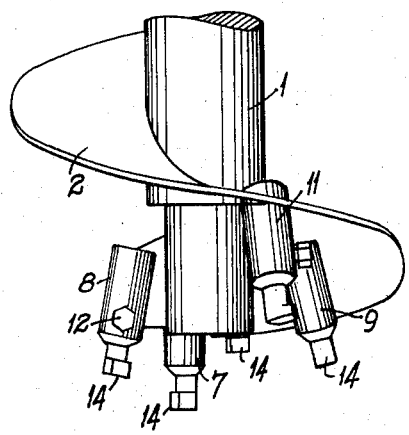
Figure 3:
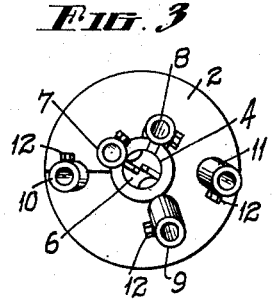
Figure 4:
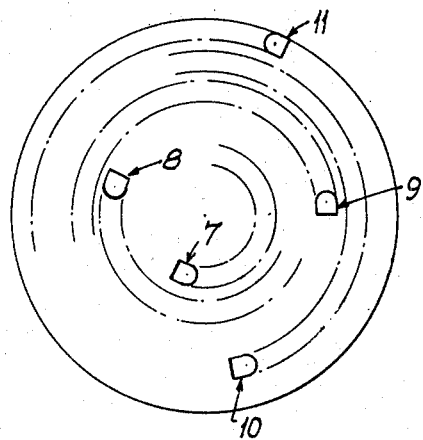

The said pilot drill and the cutting tips are preferably removably carried upon the post-hole digger for replacement and some of the cutting tips are carried upon the helical blade itself while some of the innermost cutters are disposed upon the stem itself at its terminating point. In order, however, that the invention may be more clearly understood it will now be described with reference to the accompanying drawings in which:

Fig. 1 is a front elevational view of a post-hole digger in accordance with this invention, in which the cutting tips for the cutters are not shown, Fig. 2 is an enlarged side elevational view of portion of the post-hole digger in accordance with this invention, illustrating the disposition of the cutters with respect to the helical blade and the stem and in which the pilot drill has been removed, Fig. 3 is an underside plan view of Fig. 1, and Fig. 4 is a diagrammatic underside plan view illustrating the paths of movement of the respective cutters with respect to the helical cutting blade.

The stem 1 is surrounded by a helical blade 2 the stem 1 having a joining flange 3 which is apertured so that the tool may be secured to the rotatable means for propelling it. The stem 1 has a reduced diameter portion 4 the terminating end of which has a threaded socket into which may be inserted the threaded stem 5 of the pilot drill 6. Thus the pilot drill 6 is easily removable for replacement or sharpening and is so adapted that it projects beyond the cutters of the tool and forms a lead-in means for the post-hole digger.

The cutters 7, 8, 9, 10 and 11 are each in the form of a socket secured upon the helical blade 2 or upon the reduced diameter section 4 and having locking screws 12 adapted so that the tips 14 may be inserted therein but are removable for replacement and sharpening when necessary. Each cutter tip 14 has a tungsten or other tip which will resist the abrasive action to which it is submitted when cutting.

The sockets 7 and 8 are secured upon the reduced diameter section 4 of the stem 1 and the sockets 9, 10 and 11 are secured upon the helical blade 2 the sockets 7, 8, 9, 10 and 11 are so disposed with respect to the stem 1 that each successive cutter tip carried in its socket extends down beyond the adjoining tip from the outermost socket 11 to the innermost socket 7. It will be seen therefore that the tip in the socket 7 forms the lowest and innermost cutting surface and each successive socket 8, 9, 10 and 11 is slightly above this tip. Each of the said sockets for the cutter tip 14 is disposed at a slight angle outwardly from the axis of the stem 1 which provides a means of disposing the tip to give it a sharp cutting edge and in fact provides a means whereby the outermost cutter tip carried in the socket 11 will actually cut outside the periphery of the helical blade 2. The arrangement of the sockets 7, 8, 9, 10 and 11 is such that the cutter tips 14 will each cut a separate circle around the pilot drill 6 and each circle of cut is separated from its adjoining cut.

The arrangement of the sockets 7, 8, 9, 10 and 11 is such that it may be said that in a transverse direction the sockets and thus the cutter tips are set in substantially a spiral curve but in the longitudinal direction they are set in a substantial helix in which the pitch of the helix is substantially less than the pitch of the helical blade 2.

The progressive outward positioning and upward location of the cutters may be varied according to the width of the cutters and the number used and this in turn may vary according to the conditions of the ground in which it is operated, but in general the cutters are disposed in such a way that spaces are left between the circles of cut formed by each respective cutter so that the stone or material being cut is easily broken away during the course of operations of the post-hole digger but at the same time there is still ample room for the disposal of the material past the cutting blade so that it may be raised by means of the helical blade.

What I claim is:

1. An improved post hole digger comprising a stem, a helical blade around and fixedly supported by said stem, said blade being of constant radius and terminating in a substantially radial lower leading edge, a pilot drill, means for coaxially and removably mounting said drill upon the lower end of the stem to project downward from the stem, a series of socket members secured to said blade project down from the under surface of the lower convolution of the said helical blade at different distances from the axis of the stem and at different radial spacings, removable cutter tips adapted to be mounted in said socket members and having a total width less than the radial distance from the outside of the said pilot drill to the edge of the said helical blade, the innermost portion of a cutter tip and the outermost portion of the next adjacent cutter tip positioned closer to said stem lying on spaced concentric circles whereby the said tips cut separate unconnected channels around a deeper axial pilot hole formed by said drill, and means to mount said tips fixedly in said sockets.

2. An improved post hole digger comprising a stem, a helical blade around and fixedly supported by said stem, said blade being of constant radius and terminating in a substantially radial lower leading edge, a pilot drill, means for coaxially and removably mounting said drill upon the lower end of the stem to project downward from the stem, a series of socket members secured to said blade to project down from the under surface of the lower convolution of the said helical blade at different distances from the axis of the stem and at different radial spacing and at different operating depth, removable cutter tips adapted to be mounted in said socket members and having a total width less than the radial distance from the outside of the said pilot drill to the edge of the said helical blade, the innermost portion of a cutter tip and the outermost portion of the next adjacent cutter tip positioned closer to said stem lying on spaced concentric circles whereby the said tips cut separate unconnected channels at different depths around a deeper axial pilot hole formed by said pilot drill, and means to mount said tips fixedly in said sockets.

3. An improved post hole digger comprising a stem, a helical blade around and fixedly supported by said stem, said blade being of constant radius and terminating in a substantially radial lower leading edge, a pilot drill means for coaxially and removably mounting said drill upon the lower end of the stem to project downward from the stem, a series of socket members secured to said blade to project down from the under surface of the lower convolution of the said helical blade at different distances from the axis of the stem and at different radial spacings and at depths decreasing progressively outward from the said pilot drill, removable cutter tips adapted to be mounted in said socket members and having a total width less than the radial distance from the outside of the said pilot drill to the edge of the said helical blade, the innermost portion of a cutter tip and the outermost portion of the next adjacent cutter tip positioned closer to said stem lying on spaced concentric circles whereby the said tips cut separate unconnected channels of progressively lesser depth outwards from a deeper axial pilot hole formed by said pilot drill, and means to mount said tips fixedly in said sockets.

4. An improved post hole digger comprising a stem, a threaded axial socket at the lower end of said stem, a helical blade around and fixedly supported by said stem said blade being of constant radius and terminating in a substantially radial lower leading edge adjacent said socket, a pilot drill engaged in the said socket to project axially downward from the stem, a series of socket members secured to the lower convolution of the said helical blade to project downwards therefrom at different distances from the axis of the stem and at different radial spacings and at a different operating depth, removable cutter tips adapted to be mounted in said socket members and having a total width less than the radial distance from the outside of the said pilot drill to the edge of the said helical blade, the innermost portion of a cutter tip and the outermost portion of the next adjacent cutter tip positioned closer to said stem lying on spaced concentric circles whereby the said tips cut separate unconnected channels at different depths around a deeper axial pilot hole formed by said pilot drill, and means to mount said tips fixedly in said sockets.

References Cited in the file of this patent
UNITED STATES PATENTS

| | | |
|---|---|---|
| 2,554,820 | Evans | May 29, 1951 |
| 2,594,261 | Henning | Apr. 22, 1952 |
| 2,701,126 | McClennan | Feb. 1, 1955 |
| 2,741,462 | Baca | Apr. 10, 1956 |

FOREIGN PATENTS

| | | |
|---|---|---|
| 373,359 | Germany | Apr. 11, 1923 |